Figure 1:
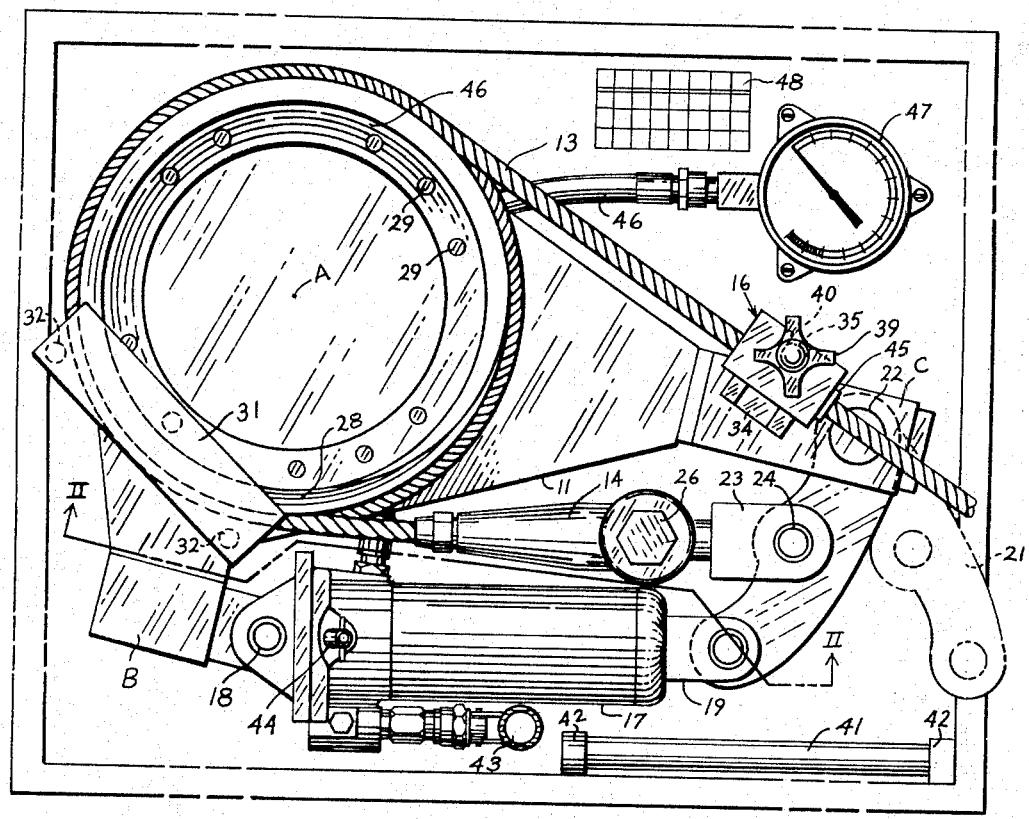

Sept. 19, 1967  R. M. BUSH  3,342,067
TESTER FOR WIRE ROPE FITTING
Filed May 28, 1965

INVENTOR.
ROBERT M. BUSH
BY
H. W. Brelsford
ATTORNEY

United States Patent Office 3,342,067
Patented Sept. 19, 1967

3,342,067
TESTER FOR WIRE ROPE FITTING
Robert Martin Bush, Goleta, Calif., assignor to Hydranautics, Santa Barbara, Calif., a corporation of California
Filed May 28, 1965, Ser. No. 459,546
3 Claims. (Cl. 73—158)

This invention relates to the testing of fittings secured to the ends of wire rope or other cable to determine the strength of attachment of the fitting to the wire rope.

The word "fitting" as used in this specification means any type of a connector attached or formed on the end of wire rope. This term may include an eye splice, with or without a thimble, or any of a variety of connectors such as a clevis on the end, an apertured tongue, hook or any special purpose connection or fitting. The attaching of a fitting other than by a splice may be done in several ways. One way is to mechanically grip the straight end of a wire rope by means of wedges manually inserted in the interior of the wire rope and surrounded by a conical fitting body. Another method of attaching fittings is to swage a collar or tube about the end of a wire rope and connect a fitting to the tube or collar. Still another way is to splay or spread out the ends of a wire rope inside a conical cavity and pour the cavity full of zinc, solder or other molten metal. Various other special attachments are available, but these common methods apply to most commercial fittings.

The present invention provides a mechanism for testing the attachment of fittings to wire rope. This attachment is critical and only the most expert craftsmen can do a satisfactory job. If a fitting lets loose from wire rope while under heavy load not only is the load endangered, but the elastic stretch of the wire rope causes it to lash and whip about, frequently with loss of life. These dire consequences have resulted in regulations in the U.S. Navy, for example, prohibiting the attachment of fittings to wire rope except at certain well supervised stations. This seriously impairs the flexibility of shipboard operations, making the ship dependent on land stations for a supply of fitted wire rope.

The testing of fittings on short lengths of wire rope is usually simple because both ends are usually equipped with a fitting and a simple tension pull on one end of the cable while the other end is secured will ordinarily suffice. The problem becomes difficult, however, where long lengths of rope are used such as those aboard ocean going vessels, tall cranes, logging operations and other industries using long rope lengths. Various attempts have been made to devise testers for long length cables. Most commonly a wire rope clamp has been employed which secures the wire rope near the fitting and then tension is applied to the fitting. However, adequate testing of the fitting requires a strain on the wire rope in excess of the normal rated strength of the wire rope, and under such condition the wire rope is damaged where it is contacted by the clamp.

The present invention makes use of a stationary drum about which a wire rope may be wrapped. If two to four turns of rope are wrapped around the drum, tension forces of many tons may be applied to one end while a pull of several hundred pounds will hold the other end in place. This makes possible testing only a short part of the end of a long rope rather than testing the entire length of a cable to determine the strength of attachment of a fitting. This stationary drum makes possible also a simple type of clamp to hold the cable against slippage on the drum. Most importantly, however, is permits the holding clamp to exert only a mild pressure on the wire rope with the result that there is no damage to the cable.

It is therefore an object of the present invention to provide a fitting tester for long wire ropes wherein tension is applied to only a short length of the rope adjacent to the fitting.

Another object is to provide a fitting tester wherein wire rope or cable adjacent to the fitting is wrapped about a stationary drum.

Another object is to provide a fitting tester for long wire ropes wherein the length of wire rope from a gripping mechanism to the fitting is extremely short to reduce the whip hazard upon failure of a fitting during test.

Still another object is to provide a tester for fittings on long wire ropes wherein the entire tester mechanism is self-contained and compact in size.

Figure 2:
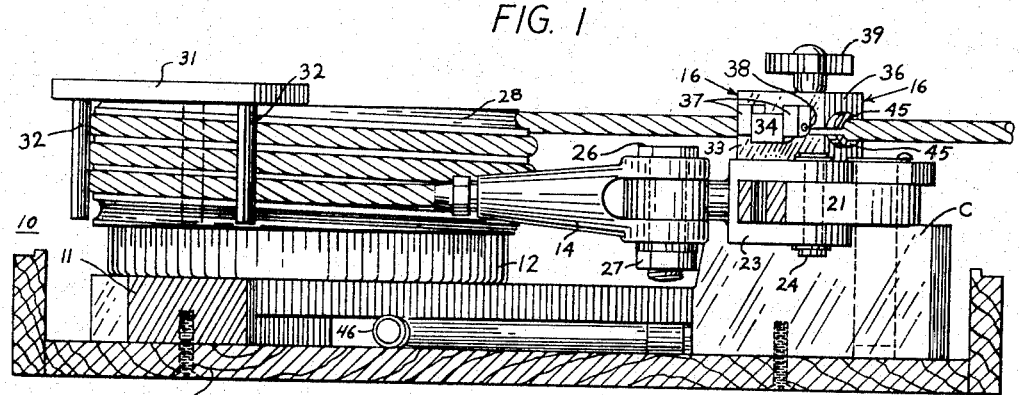

Other objects, advantages and features of the invention will be apparent in the following description considered together with the drawing forming an integral part of this specification in which:

FIG. 1 is a plan view of a mechanism embodying the invention, showing a cable and fitting under test and showing the mechanism disposed in a carrying case for ready portability, and FIG. 2 is a sectional view along the line II—II of FIG. 1.

Referring to the drawings, the entire device may be disposed in a carrying box 9 only the lower half of which is shown, and this box may be similar in size to a suitcase to allow the tester to be carried from a storage area to an area where a cable or wire rope is located on which the fitting is to be tested. The tester itself may be referred to generally by the reference number 10 and has an angular frame 11 having an apex of the angle A, a downwardly extending branch as shown in FIG. 1 to form one end B, and a rightwardly extending branch as viewed in FIG. 1 to form another end C. A stationary drum 12 is disposed at the apex A of the frame 11 and there may be wrapped about this drum one end of a wire rope 13 having a fitting 14 to be tested which is secured to the terminus of the wire rope 13. A clamp 16 is disposed on the frame end C and engages the wire rope 13. Secured to the end B of the frame 11 is a hydraulic jack 17 which may be of any conventional type and this jack is pivoted to the frame end B at 18. The jack 17 has a projecting piston rod 19 which is pivoted to one end of an arm 21, the other end of which is pivoted to end C of the frame 11 at 22. A clevis 23 is pivoted near the middle of the arm 21 by a pin 24 and the clevis may be formed with an eye 25 fitting into the clevis of the fitting 14 to be tested and the two may be joined together by a bolt 26 on which a nut 27 may be threaded.

It will be appreciated that the angular frame 11 together with a hydraulic jack 17 and the pivoted arm form a quadrangle which is presently believed to be the most compact shape for the tester. The disposition of the stationary drum 12 at the apex A of the angular frame 11 enables the wire rope to be wrapped about the drum so that the fitting to be tested is disposed between the hydraulic jack 17 and one branch of the angular frame 11.

Referring now to the drum 12 it will be noted that helical grooves 28 are formed therein to assist in wrapping the wire rope 13 about the drum and to get a greater bearing area between the drum and the wire rope. The drum is preferably an open cup or flanged cylinder secured by bolts, studs or other fasteners 29 to the frame 11.

A safety guard may be manually removable from the drum 12 to prevent whipping or lashing of the wire rope 13 in the event that the fitting 14 fails to grip the wire 13 under tests. While this removable guard may be of many various constructions, there is illustrated a rectangular plate 31 having three downwardly depending pegs 32, one or more of which are inside of the open top drum 12 and one or more of which are outside to be disposed outside of the cable 13 being tested. In the event of failure of the fitting 14 being tested the cable 13 will be under elastic elongation and a sudden failure would normally result in the cable whipping about upon this release of elastic elongation. The whipping cable snaps against the legs or pegs 32 which limit any lashing of the cable.

A clamp 16 may consist of a lower half 33 having a block 34 secured thereto as one part of a hinge. The clamp has an upper member 36 having two lugs 37 outboard of the block 34 and through which a pin 38 may be passed to form a hinge. One edge of the upper block 36 may be slotted at 40 to receive a bolt 35 pivoted to the lower block 33, and on top of this bolt may be threaded a hand wheel 39 so that the upper block 36 may be pressed downwardly against the lower clamp block 33. Formed in the lower block 33 and in the upper block 36 may be semi-cylindrical recesses in which are disposed different sets of removable half cylinders 45 which act as clamp jaws, each set having a different interior diameter, to accommodate wire rope of different diameters. In this fashion the clamp 16 may be used to engage wire ropes of a wide variety of diameters.

Referring now to the hydraulic jack 17, as mentioned previously, this can be of any desired commercially available construction, or may be specially constructed. The jack illustrated is of the commercially available type having a built-in reservoir and its own built-in hydraulic pump. A pump handle 41 may be conveniently secured by flexible catches 42 in the box 9 and when removed it is disposed on a pump handle stub 43. Thereafter the operator may rock the pump handle 41 right and left as viewed in FIGS. 1 and 2 to pump fluid in the jack 17 to cause the piston rod 19 to move to the right. Upon completion of the test a valve 44 is manually opened relieving the pressure that caused the piston rod 19 to move to the right and thereupon the jack will resume a starting position illustrated in FIG. 1. A conduit 46 is connected to the pressure chamber of the jack 17 and leads to a pressure gauge 47 calibrated directly in pounds of pull on the cable. Alternatively the gauge may indicate the pressure at any one instant that is causing the piston rod 19 to move to the right. A suitable conversion table 48 may be secured to the box 9 which correlates the diameter and type of wire with test forces, or alternatively may correlate the pressures on the gauge 47 with the test tension for wires of various diameters. The operator accordingly applies the necessary hydraulic pressure on the jack 17 to reach the indicated tension on the chart 48 and he then knows that the cable 13 is being stretched by a tension sufficient to properly test the attachment of the fitting 14 to the wire 13. The maximum stroke of the jack 17 is indicated by the broken outline of the pivoted arm 21 in the lower right-hand part of FIG. 1.

It has been found in actual practice that an extremely small clamping force may be applied by the clamp 16 and yet a force of several tons may be applied to the arm clevis 23 which, in turn, is transmitted to the test fitting 14. In fact, for small cables it has been found that the cable being tested may be manually held at point C on the frame 11 provided the two and one-half turns of the cable are taken around the drum 12 as illustrated, and this manual grasp is enough to hold the cable when tested to its working strength. The use of a helical grooved stationary drum 12 as illustrated reduces the force of restraint of the clamp 16 to approximately 1/250 of the test tension. This low clamping effort together with the removable sets of semi-cylindrical inserts 45 insures that there will be no damage to the cable being tested by virtue of applying the restraining effort or force.

Operation

The operation of the tester is as follows. One end 13 of a wire rope having a fitting to be tested is wrapped around the drum 12 to dispose the fitting 14 being tested adjacent to the clevis 23. The bolt 26 is passed through the clevis on the fitting 14 and into the eye 25 and the bolt is secured by a nut 27. The other end of the wire rope 13 is manually pulled taut and inserted between the jaws 45 on the clamp 16 and the clamp is then closed as illustrated and the hand wheel 39 is manually tightened to frictionally engage the wire 13 by the jaws 45. The pump handle 41 is next removed from its retaining catches 42 and disposed over the pump stub 43 and is then reciprocated right and left as viewed in FIG. 1. This causes fluid from the reservoir of the hydraulic jack 17 to be forced under pressure against a piston in the jack to cause the piston rod 19 to move to the right. This, in turn, rotates the lever arm 21 in a counterclockwise direction about its pivot 22 which, in turn, pulls on the fitting 14 being tested, moving it to the right against the elastic stretch of the wire rope 13. The operator continues the pumping until the hydraulic pressure indicated on the gauge 47 (which may be calibrated in tension forces) matches the indicated tension for the particular diameter of wire rope 13 being tested, at which point he knows that the wire has been subjected to its test stress, which, in turn, means that the attachment of the wire 13 to the fitting 14 is satisfactory. Upon completion of a satisfactory test the release valve 44 is manually opened permitting the piston rod 19 to move to the left to release the tension, whereupon the hand wheel 39 is operated to release the wire 13 and the entire cable is removed.

Prior to applying the pressure to the jack 17 the guard 31–32 is placed over the edge of the drum 12 and if the connection of the wire rope 13 to the fitting 14 fails during testing, the lash and whip of the elastically elongated wire 13 will be limited by the downwardly depending pegs or legs 32 on this guard.

It will be appreciated by those skilled in the art that different geometries of frame, hydraulic jack (or other motor) and pivoted arm 21 may be employed and still obtain the results and the type of operation described in this specification. Also, it will be realized that different types of fittings 14 may be tested with the only requirement being that the clevis member 23 be changed to engage these different fittings. For example, if a spliced eye is being tested on the end of a cable, a double clevis member will be used instead of the clevis and eye 23–25 illustrated. For these and various other reasons the invention is not limited to the specific mechanism illustrated and all modifications and variations that fall within the true spirit and scope of the invention are included within the terms of the following claims.

What is claimed is:

1. A compact tension tester adapted for manual portability for testing fittings secured to the ends of long ropes comprising:
   (a) a frame forming an angle;
   (b) a stationary drum located on the frame at the apex of the angle and about which one end of a long rope may be wrapped, said rope having a fitting on the end which projects from one part of the drum and further having a rope body projecting from another part of the drum;
   (c) a clamp secured to an end of the frame to grip the projecting rope body;
   (d) an arm pivoted to one end of the frame and having an outer end;
   (e) means on the arm for attaching said fitting being tested;
   (f) a motor pivoted to the other end of the frame and connected to the arm to rotate the arm on its pivot to apply tension to the fitting being tested;

(g) and means for indicating the amount of tension applied to the fitting;

whereby the fitting may be subjected to tension with a minimum straight length of the rope being employed, resulting in compactness and small size of frame with resultant low weight to permit manual portability of the entire tester.

2. A tension tester as set forth in claim 1 wherein the arm means for attaching a fitting thereto is located intermediate the pivot and the outer end.

3. A tester as set forth in claim 1 wherein a removable member engages the drum and has a plurality of pegs disposed over the exterior of the drum to limit rope lashing in event of failure of a fitting under test.

References Cited

UNITED STATES PATENTS

| | | |
|---|---|---|
| 1,779,581 | 10/1930 | Behnke. |
| 2,321,875 | 6/1943 | Temple _____ 73—158 X |
| 2,416,012 | 2/1947 | Lee et al. _____ 73—95 |
| 2,420,202 | 5/1947 | Setz _____ 73—89 |
| 2,459,738 | 1/1949 | Prettyman et al. _____ 73—95 |
| 2,584,282 | 2/1952 | Nelson _____ 73—103 X |
| 2,824,446 | 2/1958 | Stutzer _____ 73—95 |
| 3,171,277 | 3/1965 | Gloor _____ 73—103 |

JAMES J. GILL, *Acting Primary Examiner.*

RICHARD C. QUEISSER, *Examiner.*

J. H. WILLIAMSON, J. W. MYRACLE,
*Assistant Examiners.*